United States Patent [19]

Baumeister

[11] Patent Number: 4,739,409

[45] Date of Patent: Apr. 19, 1988

[54] INTELLIGENT EXPOSURE CONTROL FOR ELECTRONIC CAMERAS

[75] Inventor: Hans-Peter Baumeister, Churchville, N.Y.

[73] Assignee: Eastman Kodak Company, Rochester, N.Y.

[21] Appl. No.: 917,872

[22] Filed: Oct. 10, 1986

[51] Int. Cl.$^4$ .................. H04N 5/235; H04N 5/238
[52] U.S. Cl. ................... 358/213.16; 358/221; 358/228; 358/213.19
[58] Field of Search .............. 358/213.16, 213.15, 358/213.17, 213.18, 213.19, 213.23, 221, 228, 211

[56] References Cited

U.S. PATENT DOCUMENTS

| | | | |
|---|---|---|---|
| 3,715,491 | 2/1973 | Finch | 178/7.2 |
| 3,884,726 | 5/1975 | Landecker | 136/203 |
| 4,210,394 | 7/1980 | Sato et al. | 354/234 |
| 4,307,423 | 12/1981 | Atherton | 358/213 |
| 4,340,284 | 7/1982 | Ohtsubo et al. | 354/50 |
| 4,402,185 | 9/1983 | Perchak | 62/3 |
| 4,405,949 | 9/1983 | Hockenbrock et al. | 358/237 |
| 4,477,164 | 10/1984 | Nakai et al. | 354/412 |
| 4,489,742 | 12/1984 | Moore et al. | 136/203 |
| 4,493,939 | 1/1985 | Blaske et al. | 136/212 |
| 4,525,743 | 6/1985 | Wood, Jr. et al. | 358/221 |
| 4,551,762 | 11/1985 | Levine | 358/221 |
| 4,580,168 | 4/1986 | Levine | 358/213.16 |
| 4,587,563 | 5/1986 | Bendell et al. | 358/213.16 |

OTHER PUBLICATIONS

"How Today's Cameras are Automated", Camerart, Jan. 1982, pp. 43-48, 53.
"Photographic Speed of Solid-State Arrays", by F. Moser et al, Photographic Science and Engineering, Sep.-/Oct., 1979.
"Fuji Still Video System", Photo Trader, Sep. 17, 1986.
"Canon's Still Video Camera is Here!", by Tony Galluzzo, Modern Photography, Aug. 1986, pp. 26-27.
"Revolutionary New Auto-Focus SLR Camera: Minolta 7000", by Naomichi Fujita, Camerart, Mar. 1985, pp. 36-41.

Primary Examiner—Jin F. Ng
Assistant Examiner—Stephen Brinich
Attorney, Agent, or Firm—Robert M. Wallace

[57] ABSTRACT

In an electronic still camera adapted for professional or amateur photography, a solid state thermo-electric cooler rapidly cools a solid state image sensor (imager) in accordance with the ambient illumination or subject brightness, so as to rapidly increase the sensitivity of the imager to the required level. Thus, the device may be used in place of a flash attachment for still photography under low-light conditions. A microprocessor controls the cooler and determines optimum imager temperature for a given set of subject brightness, shutter speed and aperture size values. These values are correlated to corresponding optimum imager temperatures by a set of polynomials—or by a set of look-up tables—stored in a read only memory accessed by the microprocessor.

25 Claims, 6 Drawing Sheets

INTELLIGENT EXPOSURE CONTROL FOR ELECTRONIC CAMERAS

BACKGROUND OF THE INVENTION

1. Technical Field

This invention relates to electronic still cameras useful in professional or amateur still photography and which use a semiconductor imaging sensor—such as a charge coupled device imager—instead of film.

2. Description of Related Art

An example of an electronic still camera is the Canon RC-701 still video camera recently introduced for commercial sale by Canon Inc., 3-30-2 Shimomaruko, Otako, Tokyo 146 JAPAN. Such cameras typically include a charge coupled device (CCD) imager for sensing an image, and a magnetic disk recording system for storing the image (instead of film). Such imagers suffer from internally generated noise, such as the so-called "dark current" which accumulates in each individual CCD "bucket" even in the absence of any incident light on the imager. This dark current diminishes the ability of the imager to clearly sense an image under low light or nighttime conditions, thus reducing the effective sensitivity of the imager. This necessitates the use of a flash attachment or the like for nighttime photography. Of course, a flash attachment suffers from the disadvantage that the flash illumination falls off with the square of the distance between the flash attachment and the subject being photographed.

The dark current of a CCD imager varies with temperature. In fact, various signal processing techniques are known for compensating for temperature variations in a video signal generated by a charge coupled device imager. (See, for example, Sequin et al, *Charge Coupled Devices,* Academic Press, 1973, and U.S. Pat. No. 4,307,423.) A suggestion has been made to reduce noise in a solid state television camera, comprising a solid state line scanning imager, by cooling the solid state line scanning device with a thermo-electric module. (See U.S. Pat. No. 4,532,544.) However, no suggestion is made for intelligently controlling the imager temperature. Therefore, it would not seem that such a television camera would be useful under a wide range of frequently changing exposure conditions or settings, such as may be encountered in still photography where aperture size and shutter speed are sometimes changed for every exposure.

3. The Problem

The problem is how to adapt a CCD imager to high-quality still photography. In such applications, there is a need to precisely optimize aperture size and exposure time (and imager sensitivity if possible) for each individual exposure, since subject brightness, ambient lighting, etc., may be different for each exposure. There is a need to accommodate daylight as well as nighttime conditions. The prior art solution of simply using a flash attachment for nighttime photography provides insufficient illumination at long range. At short range, a flashbulb can disturb the subject being photographed (or damage it, in the case of indoor close-up photography of priceless art objects, for example).

SUMMARY OF THE INVENTION

Solution to the Problem

Apparatus embodying the present invention includes a still video camera having a solid state imager, a microprocessor and a memory. The microprocessor controls the imager's sensitivity ("speed" or ASA number) by controlling the imager's temperature. The imager sensitivity or ASA number can be controlled by its temperature because the sensitivity is inversely proportional to noise. One of the dominant noise sources is the so-called dark current. The dark current doubles for every 10° C. increase in imager temperature. Thus, the imager ASA number is inversely proportional to temperature (but not necessarily linearly).

Each time the camera is about to take a picture, the microprocessor senses (through a photosensor) the subject brightness and commands (if any) from the user specifying desired aperture size or exposure time. The memory contains information correlating the subject brightness to the optimum aperture size, exposure time and imager temperature. This information is based upon characteristics such as variation of the effective speed (or ASA number) of the solid state imager with temperature. The microprocessor changes the imager temperature to the optimum value by means of a thermo-electric device attached to the solid state imager. Simultaneously, the microprocessor adjusts the aperture size and shutter speed to the optimum value. Then, the camera takes a picture.

For low-light photography, the microprocessor causes the thermo-electric device to rapidly cool the imager sufficiently to obviate the need for a flash attachment. Such cooling, by reducing noise from dark current for example, increases the sensitivity of the imager so that it can produce a meaningful signal in response to a low incident photon flux characteristic, for example, of photography under nighttime or indoor conditions. Thus, in effect, the thermo-electric device and microprocessor combination can replace the usual flash attachment on the camera under some conditions, or, it can extend the range of an ordinary flash if the camera range finder indicates a need for this.

An advantage of this thermo-electric "flash" system is that its effects do not fall off with the square of the distance between the camera and the subject. Furthermore, unlike an ordinary flash attachment there is no disturbance of the subject being photographed.

A remarkable advantage of the invention is that the imager speed (ASA number) is automatically changed to rapidly accommodate a wide range of exposure conditions. In contrast, in a conventional film camera, the film speed (ASA number) can only be changed by opening the camera and changing the film (an inconvenient step).

In another embodiment of the invention, an ordinary flash attachment is provided in addition to the thermo-electric flash, the ordinary flash attachment also being controlled by the microprocessor.

BRIEF DESCRIPTION OF THE DRAWINGS

The invention may be understood by reference to the accompanying drawings of which.

DETAILED DESCRIPTION

Figure 1:
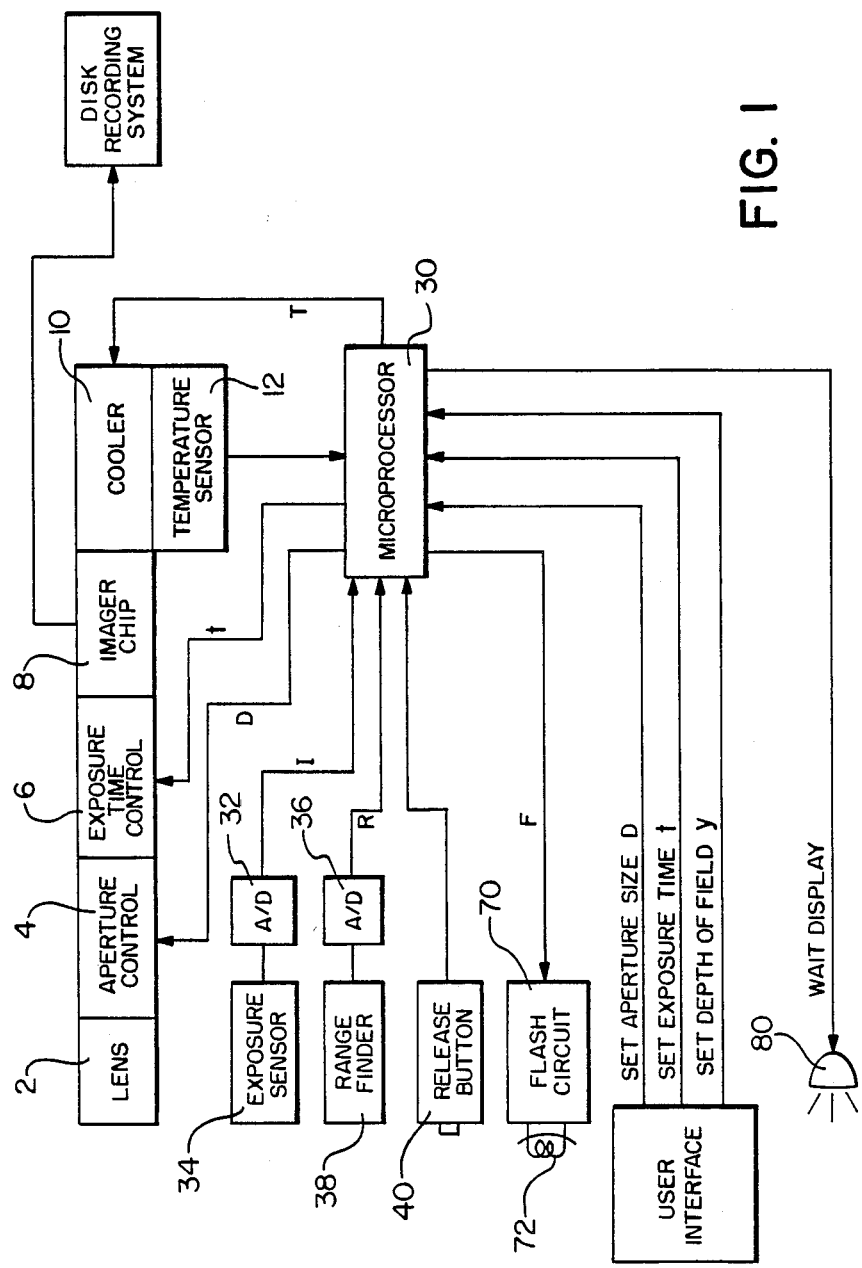
FIG. 1 is a block diagram of a still video camera embodying the invention.

Referring to FIG. 1, a still video camera embodying the present invention includes a lens 2, an aperture size controller 4, a shutter speed controller 6 and a solid state imager integrated circuit, or "chip", 8 mounted on a thermo-electric cooler 10 having a temperature sensor 12 attached thereto. The aperture and shutter controllers 4, 6 govern the exposure of a still image on the imager chip 8 in the manner of a single lens reflex camera, for example. Equivalently, the shutter speed (exposure time) controller 6 may be replaced by circuitry (in the imager chip 8) which controls the integration time of all of the sensor elements on the imager chip 8 simultaneously, in the well known manner. (See, for example, Sequin et al, *Charge Coupled Devices*, Academic Press, 1973.)

Figure 2:
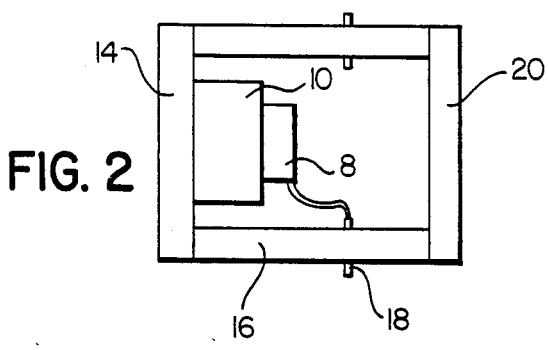
FIG. 2 is a detailed diagram of the cooling system of the camera of FIG. 1.

Referring to FIG. 2, a heat sink 14 supports the cooler 10 and attaches to an epoxy shroud 16 surrounding the imager chip 8. Connections to the the imager chip 8 are made through ports 18 provided in the epoxy shroud 16. The imager chip 8 faces the camera field of view through a window 20, the space between the imager chip 8 and the window 20 being filled with an inert gas such as nitrogen or argon or a suitable mixture thereof.

Figure 3:
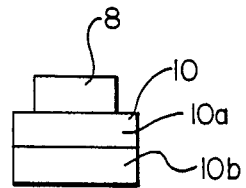
FIG. 3 is a simplified diagram of the cooling element shown in FIG. 2.
Figure 4:
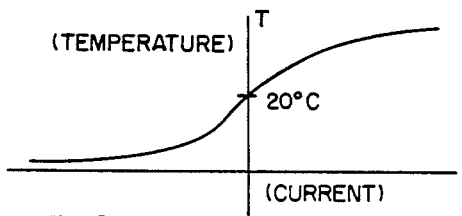
FIG. 4 is a graph illustrating the thermo-electric characteristics of the cooling device of FIG. 3.

The thermo-electric cooler 10 may be a Peltier device (for example), such as that illustrated in FIG. 3. These devices have been described previously, for example, in U.S. Pat. Nos. 4,493,939; 4,489,742; 4,402,185; and 3,884,726. The cooler 10 includes two dissimilar metals 10a, 10b, the imager chip 8 being mounted on the metal surface 10a. The temperature of the metal surface 10a is a function of the direction and magnitude of the current $i_t$ through the interface between the two metal layers 10a, 10b as illustrated in the graph of FIG. 4.

CONTROL OF IMAGER TEMPERATURE, APERTURE SIZE AND SHUTTER SPEED

Referring again to FIG. 1, a microprocessor 30 governs the aperture size controller 4, the shutter speed controller 6 and the current $i_t$ flowing through the thermo-electric cooler 10. The microprocessor 30 receives data representing the subject brightness (I) through an analog-to-digital converter 32 from a photocell (or equivalent exposure sensor) 34 mounted on the camera. The microprocessor 30 may also receive data representing the subject range (R) through an analog-to-digital converter 36 from a rangefinder 38 of the type well-known in the art. The microprocessor 30 responds to a pulse generated by a shutter release button 40 to adjust the imager temperature (T), aperture size (D) and exposure time (t) just before each picture (exposure) is taken. The microprocessor 30, in making these adjustments, may respond to optional commands entered by the user specifying either a particular aperture size (D). exposure time (t) or depth of field (Y).

SIMPLIFIED IMAGER TEMPERATURE CONTROL

Figure 5:
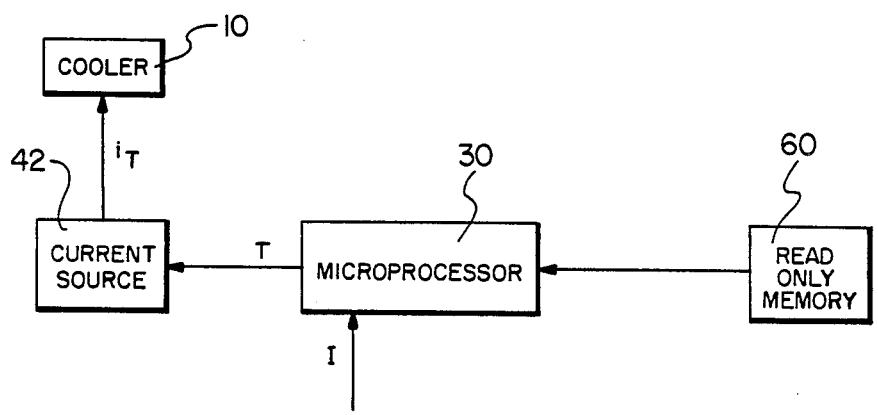
FIG. 5 is a block diagram illustrating the on-board microprocessor of the camera of FIG. 1.

In the embodiment of FIG. 5, the microprocessor 30 controls the temperature of the imager chip 8 by regulating the output $i_t$ of a current source 42 applied to the thermo-electric device 10. The current source 42 may include control means for comparing the optimum temperature T specified by the microprocessor 30 with the actual imager temperature sensed by the temperature sensor 12. The current source 42 adjusts the magnitude or direction of $i_t$ in response to any differences between the optimum and actual temperatures.

Figure 6:
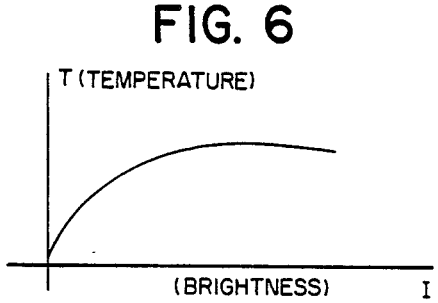
FIG. 6 is a graph illustrating the manner in which the microprocessor of FIG. 5 varies the imager temperature as a function of the subject brightness, in one embodiment.

The microprocessor 30 determines the optimum imager temperature T for a given value of subject brightness I by referring to a simple look-up table (for example) stored in a read only memory 60. The look-up table in the read only memory 60 simply stores an optimum value of imager temperature T for every possible value of subject brightness I which may be transmitted by the exposure sensor 34. The set of values stored in the read only memory 60 is illustrated, for example, in FIG. 6 in graphical form. As illustrated in FIG. 6, for subject brightness values above a certain threshold, the imager temperature remains relatively unchanged. However, below the threshold, the optimum sensor temperature falls as the subject brightness falls.

ENERGY TRADE-OFF

Figure 7:
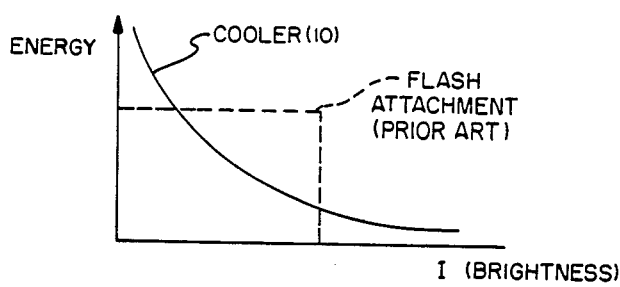
FIG. 7 is a graph comparing the energy usage of the imager cooling system of FIG. 1 with the energy usage of an ordinary flash attachment.

Referring to FIG. 7, the energy usage of the imager cooling system of FIG. 1 (solid line) may be less than the energy usage of a typical flash attachment (dashed line). In the invention, the energy usage of the imager cooler 10 falls continuously as the subject brightness increases. In contrast, the energy usage of a very simple flash attachment remains constant below a threshold subject brightness and is zero above that threshold brightness. The shaded area between the solid and dashed line curves represents the region in which the present invention provides a potential energy savings and increased battery life in a portable still video camera.

FULLY PROGRAMMED SIMULTANEOUS CONTROL OF IMAGER TEMPERATURE, APERTURE SIZE AND SHUTTER SPEED

In the preferred embodiment, the microprocessor 30 uses the coefficients of one or more polynomials stored in the read only memory 60 to determine, for each value of subject brightness I, the optimum aperture size D, exposure time t and imager temperature T. However, an elementary alternative embodiment will first be described in which an optimum value of D, t and T, for each possible value of I, is stored in a simple look-up table in the read only memory 60 as illustrated in FIG. 8.

It is well known to establish aperture size and exposure time as a function of subject brightness for a given film speed. For example, the solid line three-dimensional surface of FIG. 9b represents a polynomial, $f_2$, correlating all optimum values of aperture size (D) and exposure time (t) to a range of subject brightness values (I) for a particular film (or imager) speed (ASA number). A different ASA number corresponds to a different polynomial and a different surface. The solid line surface of FIG. 9b corresponds to a film speed of ASA 100. The dashed line is a curve lying in the solid line surface of FIG. 9b and represents the program for ASA 100 film used in the Minolta X-700 Camera sold by Minolta Camera, Inc., 2-30 Azuchimachi, Higashiku, Osaka, 541 JAPAN. This dashed line curve may be thought of as corresponding to the set of predetermined values stored in the first three columns of the look-up table of FIG. 8. namely the values for I, D and t, respectively. (In practice, the Canon RC-701 still video camera CCD sensor has an effective "speed" at room temperature corresponding to about ASA 200. For this camera, the polynomial $f_2$ would be different from that of FIG. 9b and, in fact, should be selected to correspond to ASA 200.) Programming the microprocessor chip in this manner for film cameras is well known in the art, one simplified explanation being given in "How Today's Cameras are Automated", *Camera Art,* January 1982, pages 43-48 and page 53.

Figure 8:
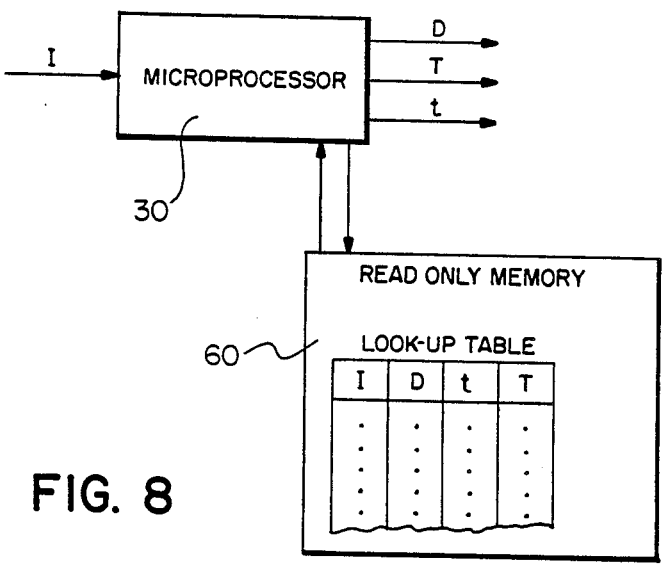
FIG. 8 illustrates an architecture of the read only memory and microprocessor for optimizing aperture size, exposure time and imager temperature simultaneously as a function of subject brightness.
Figure 9A:
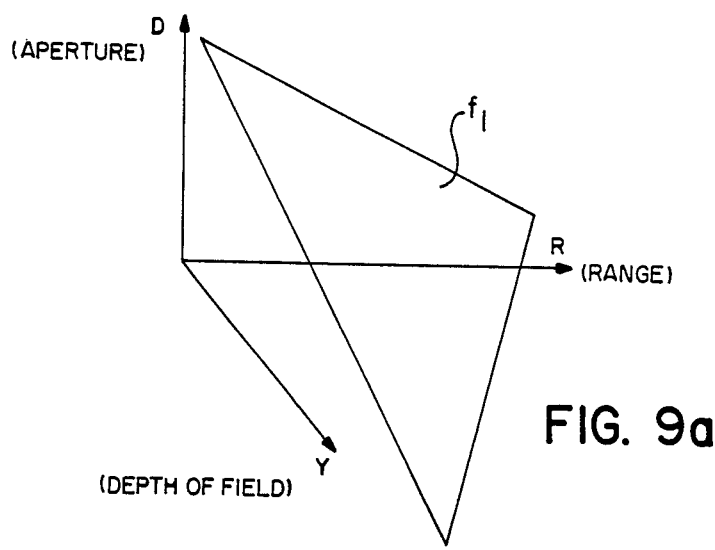
FIG. 9a illustrates a three-dimensional surface corresponding to a polynomial defining optimum aperture size as a function of subject range and depth of field.
Figure 9B:
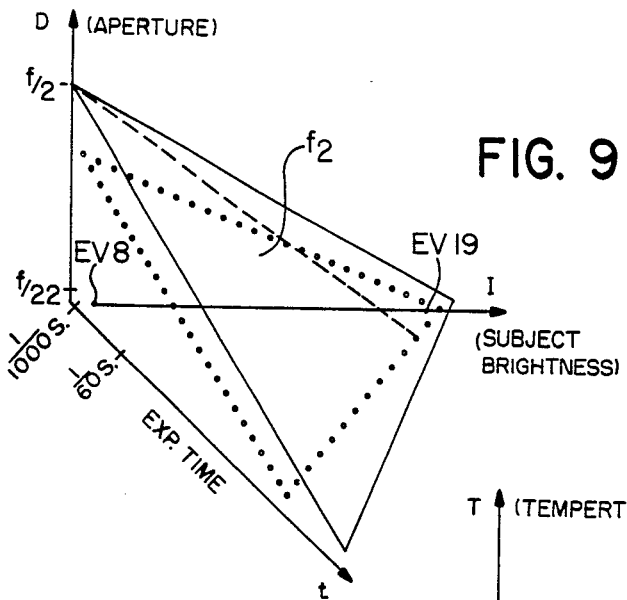
FIG. 9b illustrates a three-dimensional surface corresponding to a polynomial defining the optimum exposure time as a function of aperture size and subject brightness for a given imager sensor speed (ASA number)
Figure 9C:
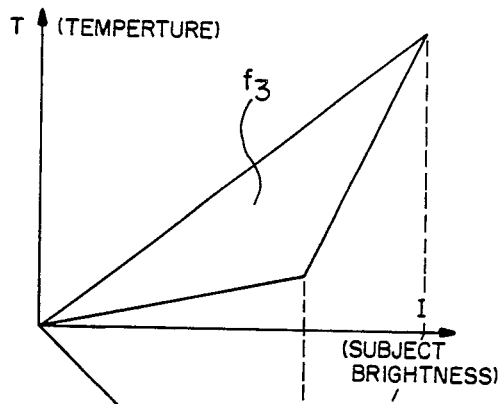
FIG. 9c illustrates a three-dimensional surface corresponding to a polynomial defining the optimum imager temperature as a function of aperture size and subject brightness.
Figure 9D:
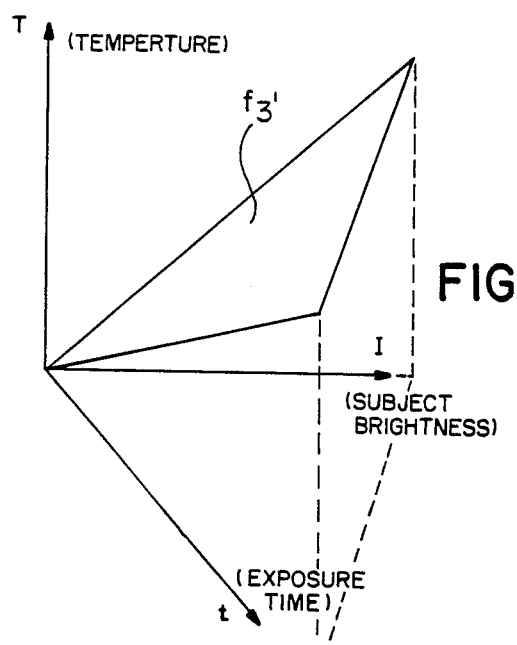
FIG. 9d illustrates a three-dimensional surface corresponding to a polynomial defining the optimum imager temperature as a function of subject brightness and exposure time for a given aperture size.

In order to control the imager temperature T, the fourth column of the look-up table of the read only memory 60 of FIG. 8 stores an optimum imager temperature value derived from the polynomial $f_3$ of FIGS. 9c or 9d (or, in one embodiment, a combination of the polynomials of FIGS. 9c or 9d) for each value of subject brightness I. The three-dimensional surface of FIG. 9c corresponds to a polynomial $f_3$ (D,I) defining the optimum imager temperature T for a given set of aperture sizes (D) and subject brightness values (I). The three-dimensional surface of FIG. 9d corresponds to a polynomial $f_3'$ (t, I) defining the optimum imager temperature T for a given set of exposure times (t) and subject brightness values (I).

Figure 10:
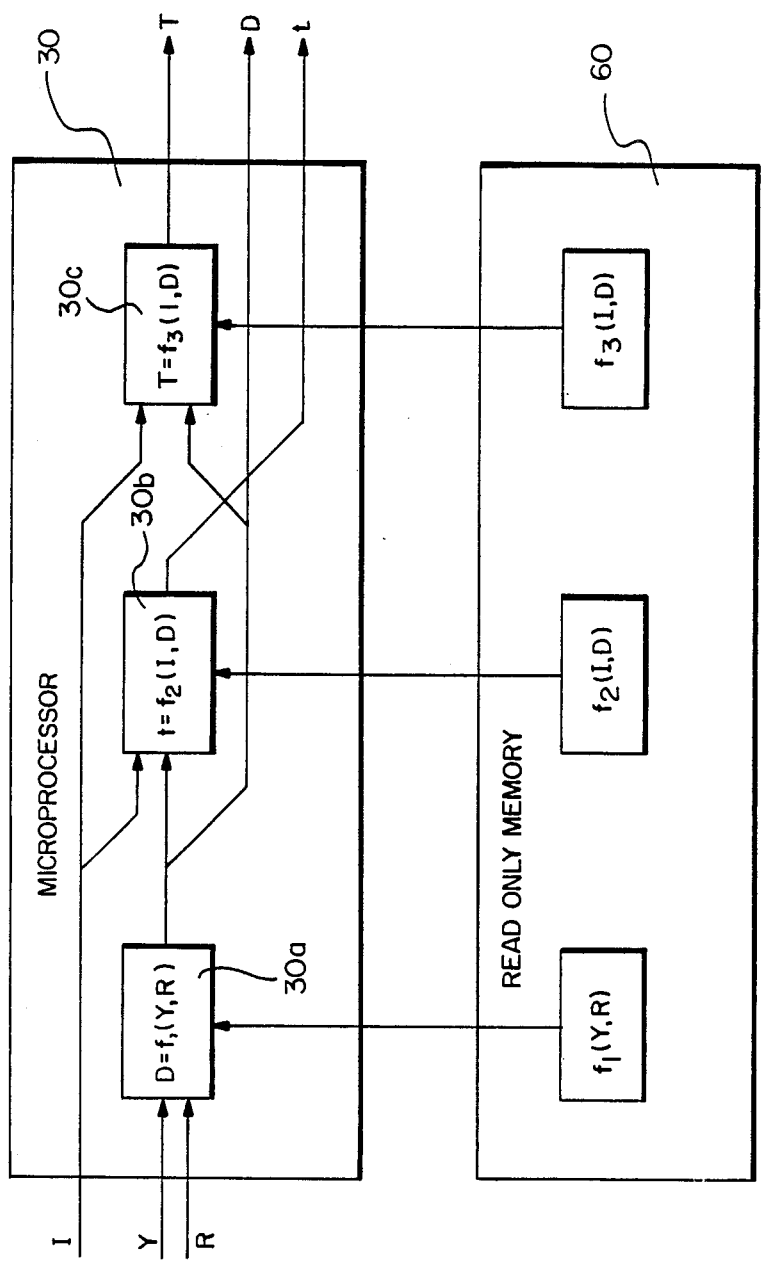
FIG. 10 illustrates an alternative microprocessor and read only memory architecture useful in the camera of FIG. 1.

Referring to the preferred embodiment of FIG. 10, the microprocessor 30 precisely computes optimum imager temperature T, exposure time (t) and aperture size (D) by substituting the values of subject brightness (I), and (at the user's option) subject range (R) and desired depth of field (Y) into various ones of the polynomials represented in FIG. 9. For this purpose, the coefficients of these polynomials are stored in the read only memory 60 for use by the microprocessor 30. The I and R values are received by the microprocessor 30 from the exposure sensor 34 and rangefinder 38, respectively. A desired depth of field value Y may, at the user's option, be entered as a digital input to the microprocessor 30 (see FIG. 1).

The microprocessor 30 includes a sub-processor 30a which determines the optimum aperture size D, based upon the subject range R and the desired depth of field Y, by substituting the received Y and R values into a polynomial $f_1(R, Y)$ (whose coefficients are stored in the read only memory 60). (The polynomial $f_1$ corresponds to the three-dimensional surface of FIG. 9a.) Alternatively, the user himself may enter the desired aperture size as a digital word into the microprocessor, thus bypassing this step.

A second sub-processor 30b receives the just-determined aperture size D and the sensed subject brightness value I, and substitutes these values into the polynomial $f_2$ (I, D) (FIG. 9b) to deduce the optimum exposure time t. (The coefficients of the polynomial $f_2$ are stored in the read only memory 60.)

A third sub-processor 30c also receives the just-determined aperture size D and the sensed subject brightness value I and substitutes these values into the polynomial $f_3$ (I, D) of FIG. 9c (whose coefficients are also stored in the read only memory 60) to deduce the optimum imager temperature T. The outputs of the three sub-processors 30a, b, c (defining, respectively, D, t, and T) are applied to the aperture size controller 4, the shutter speed controller 6 and the cooler 10, respectively, just prior to the camera taking a picture.

Changing the imager temperature T with subject brightness I changes the effective sensitivity or speed (ASA number) of the imager chip 8. Therefore, the coefficients (or equivalent data) used by the sub-microprocessor 30b to correlate optimum exposure time and/or aperture size to the sensed subject brightness value must reflect changing values of imager speed (ASA number) due to the action of the cooler 10. In fact, this is the main advantage of the invention! As subject brightness decreases, the microprocessor 30 increases the imager's speed or ASA number (by cooling it) so that the aperture size and exposure time need not be increased as much as would otherwise be necessary.

Therefore, the preferred coefficients (of the polynomial $f_2$) relied on by the sub-processor 30b do not correspond to the solid line surface of FIG. 9b (which, it will be recalled, is valid for only a particular imager speed or ASA number) but instead correspond to the dotted-line surface of FIG. 9b. The essential difference between the dotted-line and solid line surfaces of FIG. 9b is that the variations of aperture size and exposure time with subject brightness are less for the dotted-line surface.

The polynomial $f_2$ (dotted line surface of FIG. 9b) is dependent upon the polynomial $f_3$ of FIG. 9c (or FIG. 9d) so as to track changing imager temperature T. Preferably, the microprocessor 30 employs a polynomial corresponding to a combination of the polynomials $f_2$, $f_3$ and $f_3'$ of FIGS. 9b, c and d, respectively, to simultaneously determine t, D and T for a given value of I.

In practice, one can think of trying to take a picture with very dim illumination without the invention. The required exposure time t (solid line surface of FIG. 9b) may be too long for a hand-held camera. With the imager-cooling feature time t (dotted line surface of FIG. 9b) is less, possibly short enough to permit exposure with a hand-held camera.

COMBINATION THERMO-ELECTRIC COOLER AND FLASH ATTACHMENT

Figure 11:
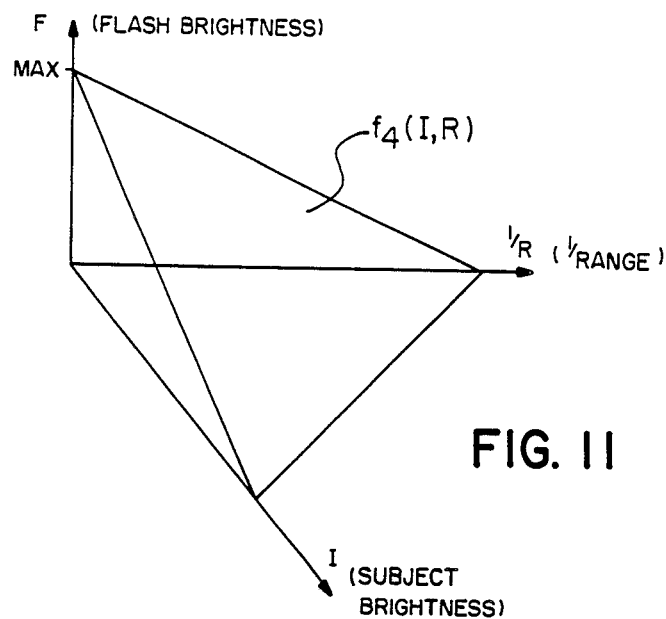
FIG. 11 illustrates a three-dimensional surface corresponding to a polynomial defining the optimum flashbulb brightness as a function of subject brightness and subject distance for a given imager speed (ASA number)

The thermo-electric cooler 10 may be combined with an ordinary flash attachment and the microprocessor 30 may include means for allocating battery energy between the thermo-electric cooler and the flash attachment. For this purpose, the microprocessor 30 controls a flash circuit 70 (FIG. 1) whose output is applied to a flash attachment 72 illustrated in FIG. 1. The microprocessor 30 controls the illumination provided by the flash attachment 72 through the flash circuit 70 using techniques well-known in the art. The processor 30 substitutes the sensed values of subject brightness (I) and range (R) into a polynomial $F_4$ (FIG. 11) in order to determine the optimum flash brightness. (The coefficients of the polynomial $f_4$ are stored in the read only memory 60.) FIG. 11 shows that the optimum flash brightness F is zero above a certain threshold subject brightness and below a certain threshold subject distance. F is maximum at an infinite subject distance and zero subject brightness. Coefficients of the polynomials $f_3$ and $f_4$ stored in the read only memory 60 may be adjusted to apportion battery energy between the cooler 10 and the flash 72 while minimizing total electrical consumption.

Figure 12:
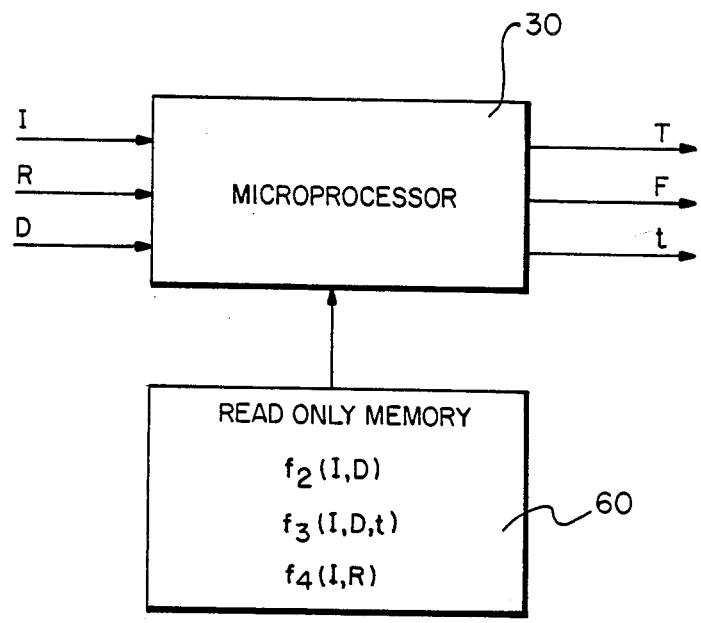
FIG. 12 illustrates another microprocessor and read only memory architecture useful in the camera of FIG. 1.

Referring to FIG. 12, the microprocessor 30 senses subject brightness and subject range and computes therefrom optimum flash brightness F, imager temperature T, exposure time t and aperture size D (if not specified by the user) by referring to the read only memory 60. It should be recognized that some or all of the various polynomials corresponding to the three-dimensional surfaces of FIGS. 9a, 9b, 9c, 9d and 11 may be combined into a single polynomial whose coefficients may be stored in the read-only memory 60. For example, the polynomials $f_2$ and $f_3$ are not really independent from one another because the ASA number of a CCD imager is a function not only of the imager temperature T but also of the exposure time t.

Preferably, the shutter release button 40 acts as a sensor, so that, when the user first touches it, but before it is depressed to trigger the shutter, the microprocessor performs the process illustrated in FIG. 10 to set the imager temperature, aperture size, shutter speed. Then, the user presses the button 40 and the shutter opens for the predetermined exposure time t (and the flash emits the requisite brightness F, if necessary). Under very dark conditions, for example, it may take a few seconds to cool the imager chip 8 to the optimum temperature, in which case the microprocessor 30 may activate a "wait" light 80 in the viewfinder to warn the user to delay taking the picture until the light goes out, giving the cooler 10 enough time to cool the imager chip 8 to the optimum temperature.

Of course, the invention is equally applicable to motion video cameras which form a succession of "still" video frames in rapid sequence. In fact, the invention provides more dramatic savings in energy when used in motion video. The amount of energy saved per video field (as illustrated in FIG. 7) under a given set of exposure conditions is the same for both motion and still video. However, this savings is multiplied 216,000 times during a one hour motion video recording (at 60 fields/sec) using the invention.

The thermo-electric cooler 8 may comprise a Peltier device known as part No. TSC 12AL sold by Varo Semiconductor, 2800 Kingsley, Garland, Texas 75040.

Cooling the imager chip 8 is just one way the microprocessor 30 may adjust imager sensitivity to the optimum value, as described. Another way to implement the present invention is to increase imager sensitivity by decreasing imager resolution and vice versa. For example, a simple charge coupled device transversal filter could be used to reduce the number of pixels by organizing the imager pixels into uniform groups and summing the pixels in each group to generate a combined pixel. The sensitivity may be adjusted by changing the size (number of pixels) in each of the uniform groups.

While the invention has been described with specific reference to preferred embodiments thereof, it is understood that variations and modifications may be made within the spirit and scope of the invention.

What is claimed is:

1. A video camera, including a semiconductive imager, said imager being characterized by a variable sensitivity, variable aperture size and a variable exposure time, said camera further comprising:
   brightness sensing means for sensing the brightness of a scene and for automatically generating therefrom a brightness value;
   aperture setting means for setting said aperture size;
   exposure setting means for setting said exposure time;
   adjusting means for adjusting said variable sensitivity; and
   computing means for automatically computing optimum values of said imager sensitivity, said exposure time and said aperture size from said brightness value and transmitting said optimum values to said adjusting means, said exposure setting means and said aperture setting means respectively, whereby said imager sensitivity, said exposure time and said aperture size are automatically adjustable to optimize the sensitivity of said imager for a continuum of scene brightness values.

2. The video camera of claim 1 wherein said adjusting means comprises a thermo-electric device in contact with said imager, and wherein said adjusting means regulates the magnitude of current flow through said thermo-electric device, whereby said imager may be sufficiently cooled to increase its sensitivity.

3. The camera of claim 1 wherein said computing means comprise:
   a read only memory adapted to store look-up table correlating optimum imager temperature values with subject brightness values; and
   a microprocessor adapted to receive a subject brightness value from said brightness sensing means, search said read only memory for a corresponding imager sensitivity-related value, and control said adjusting means.

4. The camera of claim 3 wherein said read only memory is further adapted to store a look-up table correlating optimum aperture size and exposure time values with subject brightness values, whereby said microprocessor searches said read only memory for optimum values of said aperture size, exposure time and imager sensitivity corresponding to a brightness value received from said brightness sensing means.

5. The camera of claim 1 wherein said computing means comprise:
   a processor adapted to control said adjusting means, said aperture setting means and said exposure setting means and to receive brightness values from said brightness sensing means;

a memory adapted to store information relating optimum values of aperture size, exposure time and imager sensitivity to a set of brightness values, whereby, for a given brightness value produced by said brightness sensing means, said processor is adapted to use said stored information to compute corresponding values of aperture size, exposure time and imager sensitivity.

6. The camera of claim 5 wherein said relating information stored in said memory corresponds to a set of coefficients defining a polynomial or polynomials relating aperture size, exposure time and imager sensitivity to brightness value, whereby said processor determines an optimum imager sensitivity, aperture size and exposure time by substituting said brightness value into said polynomial.

7. The camera of claim 6 further comprising means for permitting a user to predetermine either or both aperture size and exposure time prior to said processor determining said optimum imager sensitivity.

8. The camera of claim 5 wherein said processor is further adapted to respond to an optionally entered command specifying a desired depth of field, and to a sensed value of subject range, and to determine therefrom an optimum aperture size.

9. The camera of claim 5, 6, 7 or 8 wherein said information reflects the effective speed (ASA number) of said imager as a function of said imager sensitivity.

10. The camera of claim 6 wherein said polynomial is characterized in that, for decreasing brightness values, said imager sensitivity values decrease, said exposure time values increase and said aperture size values increase.

11. The camera of claim 1 wherein said camera is a still video camera and has a release button controlling the exposure of said imager, whereby said microprocessor determines said optimum imager sensitivity once each time said shutter release is touched but prior to the exposure of said imager.

12. The camera of claim 1 further comprising a flash attachment, wherein said automatic determining means controls the brightness output of said flash attachment in response to said brightness sensing means, whereby optimum values of said imager sensitivity exposure time, aperture size and flash brightness for a brightness value may be determined and transmitted to said adjusting means, said exposure setting means, said aperature setting means and said flash attachment, respectively, whenever said imager is to be exposed to a scene.

13. In a video camera including a solid state image sensor element and characterized by a variable exposure time and aperture size, the improvement comprising:
   thermo-electric means for cooling said image sensor;
   an exposure brightness sensor adapted to produce a brightness value associated with a scene viewed by said sensor element; and
   processor means controlling said thermoelectric means for setting the temperature of said solid state image sensor element to an optimum temperature value for a continum of brightness values received from said exposure brightness sensor.

14. The video camera of claim 13 wherein said processor means further controls said exposure time and aperture size so as to provide optimum values of said sensor temperature, aperture size and exposure time for each exposure of said sensor element to a scene.

15. The video camera of claim 13 wherein said thermo-electric means comprises a thermo-electric device in contact with said solid state image sensor element, and wherein said processor means regulates the direction and magnitude of current flow through said thermo-electric means, whereby said imager may be sufficiently cooled to permit low-light photography without a flash attachment.

16. The camera of claim 13 wherein said processing means comprise:
   a read only memory adapted to store a look-up table correlating optimum imager temperature values with subject brightness values; and
   a microprocessor adapted to receive a brightness value from said brightness sensor, search said read only memory for a corresponding imager temperature value, and control said thermo-electric means to cool said imager to said corresponding temperature value.

17. The camera of claim 16 wherein said read only memory is further adapted to store a look-up table correlating optimum aperture size and exposure time values with subject brightness values, whereby said microprocessor may search said read only memory for optimum values of said aperture size, exposure time and imager temperature corresponding to a brightness value received from said brightness sensor.

18. The camera of claim 13 wherein said processing means comprise:
   a processor adapted to control said temperature, said aperture size and said exposure time and to receive brightness values from said brightness sensor;
   a memory adapted to store information relating optimum values of aperture size, shutter speed and sensor temperature to a set of brightness values, whereby, for a given brightness value received from said brightness sensor, said processor is adapted to use said stored information to compute corresponding values of aperture size, exposure time and imager temperature.

19. The camera of claim 18 wherein said relating information stored in said memory corresponds to a set of coefficients defining a polynomial or polynomials relating aperture size, shutter speed and sensor temperature to brightness value whereby said processor is adapted to determine an optimum imager temperature, aperture size and exposure time by substituting an actual brightness value into said polynomial.

20. The camera of claim 19 further comprising means for permitting a user to predetermine either or both apperture size and exposure time prior to said processor determining said optimum imager temperature.

21. The camera of claim 13 wherein said processor means is further adapted to respond to an optionally entered command specifying a desired depth of field, and to a sensed value of subject range, and to determine therefrom an optimum aperture size.

22. The camera of claim 19 wherein said polynomial is characterized in that, for decreasing brightness values, said imager temperature values decrease, said exposure time values increase and said aperture size values increase.

23. The camera of claim 13 wherein said camera is a still video camera and has a release button controlling the exposure of said sensor element, whereby said microprocessor determines said optimum sensor temperature once each time said shutter release is touched but prior to the exposure of said element.

24. The camera of claim 13 further comprising a flash attachment, wherein said processor means controls the brightness output of said flash attachment in response to said brightness sensor, whereby optimum values of said imager temperature, exposure time, aperture size and flash brightness for a given value of subject brightness may be set by said processor means.

25. In a solid state video camera, including a solid state image sensor and a subject brightness sensor, the improvement comprising means for automatically cooling the temperature of said sensor to an optimum temperature corresponding to a subject brightness value sensed by said brightness sensor, whereby said cooling means reduces said sensor temperature sufficiently to permit photography under low-light conditions without requiring artificial illumination so that the sensitivity of said image sensor is optimized for a continuum of brightness values.

* * * * *